May 30, 1933.     I. Q. GURNEE     1,911,566
HARD RUBBER ARTICLE AND METHOD OF MAKING THE SAME
Filed March 17, 1932
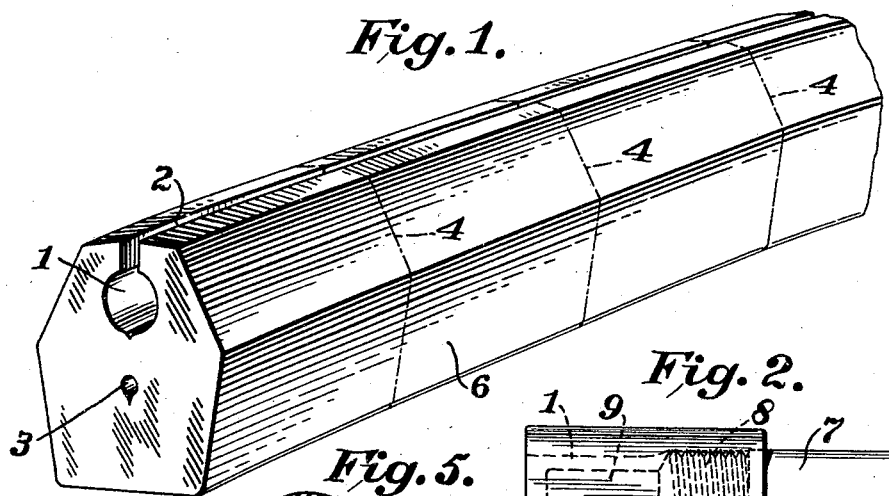
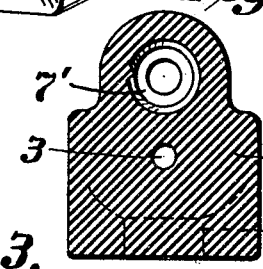
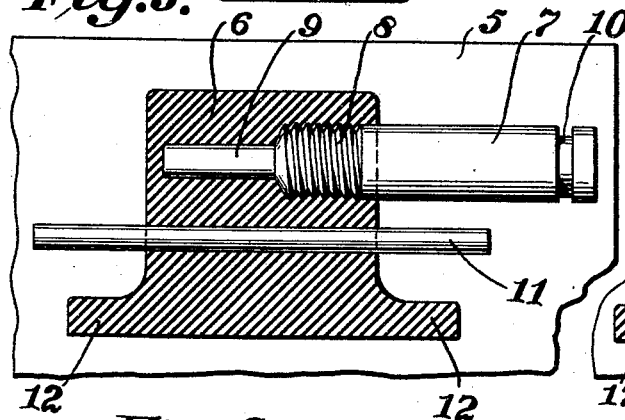 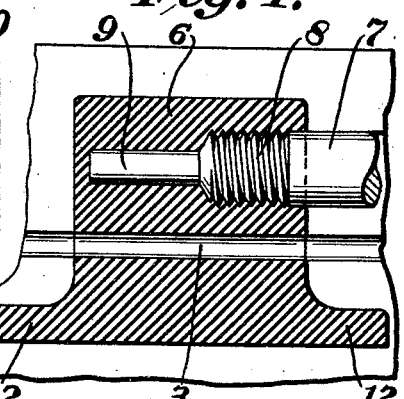
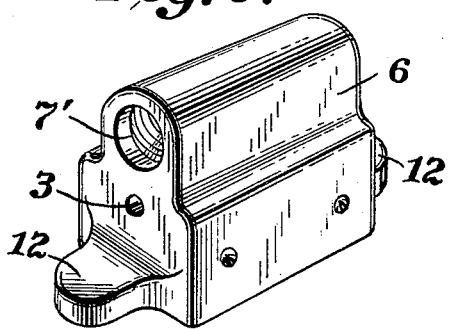 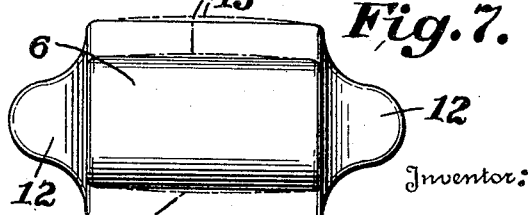
Inventor:
Isaac Q. Gurnee,
By Parker Cook
Attorney.

Patented May 30, 1933

1,911,566

UNITED STATES PATENT OFFICE

ISAAC Q. GURNEE, OF BUTLER, NEW JERSEY

HARD RUBBER ARTICLE AND METHOD OF MAKING THE SAME

Application filed March 17, 1932. Serial No. 599,581.

My invention relates to new and useful improvements in hard rubber blocks and method of making the same, and has for an object to provide a hard rubber block that may be produced in a rapid manner and, at the same time, will keep desired shape, that is, will not bulge or "blow", as is technically known to those skilled in the art.

Still another object of the invention is to produce a hard rubber block in which there is an upper threaded chamber, so that a certain electrical device may be placed therein, this latter, however, in no way entering into the spirit of the present invention.

Still another object of the invention is to produce a hard rubber block which is to be provided with an internally threaded upper chamber and is also to be provided with a small passageway through the base, so that the gases may escape while the rubber is being molded to thus prevent the bulging or "blowing" of the article, as will shortly be described.

Still another object of the invention is to produce a method of molding a hard rubber block wherein the same may be taken out of the molds while still in a heated condition and then placed in a vulcanizer for the final heat, thus permitting the articles to be molded in a relatively short time.

With these and other objects in view, the invention consists in certain new and novel arrangements and combination of parts, as will be hereinafter more fully described and pointed out in the claims.

Referring now to the drawing,

Fig. 1 is a perspective of a strip of soft rubber stock that has been run through a rod and tubing machine and is to be divided, as indicated, into blocks;

Fig. 2 shows a block with the cores in place ready for the first molding or vulcanizing operation;

Fig. 3 is a fragmentary plan view of a mold showing the first molding operation;

Fig. 4 is a similar plan with the small core removed to allow the gases to escape from the block, that is, during the final curing;

Fig. 5 is a transverse section through the completed article;

Fig. 6 is a perspective of the completed article;

Fig. 7 is a plan view, the dotted lines, however, showing a bulge which would occur if the block were made without the use of the small core.

Referring now more particularly to the several views and for the moment to Fig. 1, there is shown the rubber stock which has been run through a rod and tubing machine, there being the cylindrical bore 1, the opening 2 and what I term a bleeder hole 3. This rubber stock is then to be cut off in blocks along the dotted lines 4, so that they may be placed in a mold, shortly to be mentioned.

In Fig. 3, I have shown a fragmentary portion of a mold 5, in which may be seen one of the blocks 6 which has been cut off from the stock, as above outlined, and partly cured and pressed to shape.

Fitting within the passageway 1 of the block 6 is shown the chamber core 7 which is threaded, as at 8, and has the protruding end 9. The rear end of the core may be cut out, as at 10, so that the core may exactly fit within the block the correct distance. Thus, a chamber 7' is formed for the reception of an electrical device (not shown).

There will also be noticed another core 11 that is to be fitted within the bleeder hole 3 of the block, as may be seen illustrated in Fig. 3.

It will be understood that when the block 6 is secured in the mold and heated, it will be pressed to the shape shown in Fig. 3, that is, the block will now have the opening 2 closed, the end of the passageway 1 closed, and the block now provided with the extending lugs 12 at its base.

I have found that the block may be left in the mold in its first operation for twenty minutes and at one hundred pounds pressure, so that the block will be partly cured when removed. After these twenty minutes, it is taken out of the molds while in its hot condition.

It might be mentioned here that owing to the thickness of the block, gas forms inside the blocks when vulcanized with quick short heats, and it is only by the provision of the bleeder hole 3 with the core 11 placed therein that makes it possible to be able to remove the block after being in the mold for only twenty minutes.

There is another advantage in being able to remove the partly cured block from the mold in twenty minutes, as if the article is left in the mold for a much greater length of time, it begins to show shrinkage.

Reverting again to the steps of the process, the article is then put in a vulcanizer with a pressure of preferably sixty-five pounds and is allowed to remain for six and one-half hours which completely cures the block.

In this instance, it will be seen, however, (Fig. 4) that the core 11 is not placed within the hole 3, so that the gases that have formed in the base of the block may readily escape through this bleeder hole 3.

It will be understood that if it were not for the core 11 in the bleeder hole 3, the gases would start to form in the block during the first molding operation and the blocks, when put in the vulcanizer, would "blow" up and form the bulge, as shown by the dotted lines 13 in Fig. 7. However, by providing this core 11 and a bleeder hole 3, the gases may partly escape around the care 11 in the first molding operation while in the second operation, this is, during the vulcanizing or final curing, the core 11 being left out, the gases may readily escape from the block, so that when the article is completely cured its contours will be perfect and there will be no bulging or "blowing" in the relatively thick base or upper portion.

In Figs. 6 and 7, I have shown the completed articles, the dotted lines in Fig. 7, however, showing how this relatively thick base would bulge if the article had not been made by the process above outlined.

From the foregoing, it will be seen that with the present method it is possible for quick production inasmuch as the first heat may be limited to twenty minutes and, at the same time, there is no possibility of the base bulging or "blowing" as the gases escape from the bleeder hole, as outlined.

It will be understood that the mold may have a plurality of cavities so that a number of these articles may be molded at the one time and while in the drawing I have shown a fragmentary portion of a mold to illustrate the manner in which the method is carried out, it will be understood that there will be a plurality of cavities for making a number of the articles at the one time.

Having thus described my invention, what I claim as new and desire to secure by Letters Patent is:—

1. The method of producing a hard rubber block which consists in running vulcanizable rubber stock through a tubing machine and forming a relatively large and a relatively small bore in the stock, cutting the stock into blocks, placing cores within said bores, placing the blocks in a mold and subjecting the molds to heat and pressure for approximately twenty minutes, removing the cores from the relatively small bores, and vulcanizing the blocks for a period of approximately six and one-half hours.

2. The method of forming a hard rubber article which consists in running vulcanizable rubber through a rod and tubing machine and forming a relatively large bore and a small bore in said stock, cutting the stock into blocks, placing a core in the respective bores to respectively form a chamber and a bleeder hole within the block, heating the blocks under pressure for approximately twenty minutes, removing only the core from the bleeder hole and subjecting the block to a further heat and pressure for approximately six and one-half hours, the removal of the core in the bleeder hole permitting the escape of gases during the vulcanization to thereby prevent the article from deforming during the vulcanization.

3. The method of forming a hard rubber article with a relatively thick base which includes subjecting vulcanizable rubber stock to a rod and tubing machine to form a bore and bleeder hole in the stock, cutting the stock off into blocks and placing a core in the bore and in the bleeder hole and subjecting the block to a relatively short heat and pressure to partly cure the same, removing the core from the bleeder hole, and subjecting the block to a further heat and pressure for approximately six and one-half hours.

In testimony whereof, I affix my signature.

ISAAC Q. GURNEE.